United States Patent
Eggerton et al.

(10) Patent No.: US 9,367,672 B2
(45) Date of Patent: Jun. 14, 2016

(54) METHOD OF LOCKING AN APPLICATION ON A COMPUTING DEVICE

(71) Applicant: BlackBerry Limited, Waterloo (CA)

(72) Inventors: Gary James Eggerton, Birmingham (GB); Andrew John Farnsworth, Kidderminster (GB)

(73) Assignee: BlackBerry Limited, Waterloo, Ontario (CA)

( * ) Notice: Subject to any disclaimer, the term of this patent is extended or adjusted under 35 U.S.C. 154(b) by 139 days.

(21) Appl. No.: 13/799,531

(22) Filed: Mar. 13, 2013

(65) Prior Publication Data

US 2014/0283012 A1    Sep. 18, 2014

(51) Int. Cl.
G06F 21/30 (2013.01)
G06F 21/31 (2013.01)
G06F 21/62 (2013.01)
H04W 12/08 (2009.01)

(52) U.S. Cl.
CPC .............. *G06F 21/31* (2013.01); *G06F 21/629* (2013.01); *H04W 12/08* (2013.01); *G06F 2221/2141* (2013.01); *G06F 2221/2147* (2013.01)

(58) Field of Classification Search
CPC ..... G06F 21/31; G06F 21/316; G06F 21/629; G06F 2221/2141; G06F 2221/2147; G06F 21/30; H04W 12/08
USPC ........... 726/16–19, 2, 7, 26–27; 455/411, 410
See application file for complete search history.

(56) References Cited

U.S. PATENT DOCUMENTS

| 8,977,866 B2* | 3/2015 | Stoev ................. G06F 21/6245 713/165 |
| 2004/0103324 A1* | 5/2004 | Band ...................... G06F 21/31 726/9 |
| 2006/0105743 A1* | 5/2006 | Bocking ................. H04M 1/67 455/411 |
| 2007/0136207 A1 | 6/2007 | Davydov et al. |
| 2007/0180492 A1* | 8/2007 | Hassan et al. ...................... 726/2 |
| 2009/0125850 A1* | 5/2009 | Karstens ....................... 715/866 |
| 2009/0260010 A1* | 10/2009 | Burkhart et al. .............. 718/100 |
| 2010/0162182 A1* | 6/2010 | Oh et al. ........................ 715/863 |
| 2011/0105193 A1 | 5/2011 | Lee et al. |
| 2011/0256848 A1 | 10/2011 | Bok et al. |
| 2011/0294467 A1 | 12/2011 | Kim et al. |
| 2012/0084734 A1* | 4/2012 | Wilairat ........................ 715/863 |
| 2012/0129496 A1 | 5/2012 | Park et al. |
| 2012/0222053 A1 | 8/2012 | Huang et al. |

(Continued)

FOREIGN PATENT DOCUMENTS

EP      2521017      11/2012

OTHER PUBLICATIONS

Can I borrow your phone? Understanding concerns when sharing mobile phones, Amy K. Karlson et al, pp. 1647-1650, CHI 2009, ACM.*

(Continued)

*Primary Examiner* — Shanto M Abedin

(74) *Attorney, Agent, or Firm* — Fish & Richardson P.C.

(57) ABSTRACT

A computer-implemented method entails steps of receiving user input signifying that an application on a computing device is to be locked and, in response to the user input, locking a user within the application to thereby permit the user to utilize functionalities of the application without exiting from the application or switching to another application on the computing device.

18 Claims, 10 Drawing Sheets

(56) References Cited

U.S. PATENT DOCUMENTS

| | | |
|---|---|---|
| 2012/0284789 A1 | 11/2012 | Kim et al. |
| 2013/0160110 A1* | 6/2013 | Schechter et al. .............. 726/19 |
| 2013/0169573 A1* | 7/2013 | Nishio ................ G06F 3/04883 345/173 |
| 2013/0283199 A1* | 10/2013 | Selig et al. .................... 715/781 |
| 2013/0305354 A1* | 11/2013 | King et al. ...................... 726/19 |
| 2014/0047523 A1* | 2/2014 | Swerdlow et al. ................ 726/7 |

OTHER PUBLICATIONS

Extended European Search report mailed Aug. 30, 2013, in corresponding European patent application No. 13158910.3.

\* cited by examiner

METHOD OF LOCKING AN APPLICATION ON A COMPUTING DEVICE

CROSS-REFERENCE TO RELATED APPLICATIONS

This is the first application filed for the present technology.

TECHNICAL FIELD

The present technology relates generally to computing devices and, in particular, to access control for computing devices.

BACKGROUND

Computing devices frequently implement an access control mechanism to regulate user access to the computing device. This is frequently in the form of a main login screen that requires the user to enter a user name and password, although a variety of other techniques are known in the art, including biometrics (fingerprint recognition, facial recognition, voice recognition). Once access has been granted, the user typically has unfettered access to all software applications and functionalities of the computing device. It is further known to restrict access to certain applications or function on the computing devices. However, in some cases, it may be desirable to confine a guest user or temporary user to a particular application.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

The present technology provides an application lock for locking an application. This technology, in general, enables a main user to restrict a guest user or temporary user from exiting from the application or switching to another application on the computing device. The method of locking an application entails receiving user input to signify that an application is to be locked and then locking the application in response to the user input to thus restrict the ability of a guest user from exiting from the application or from switching to another application. As such, the guest user is locked within the application. The application disables the restricted command(s) of the application, such as an exit command, so that the only way to perform the restricted action from within the application is to provide user credentials such as a password and/or biometric input to unlock the application. Alternatively, a predetermined gesture, such as for example, a gesture resembling a padlock, may be used to unlock a locked application.

Accordingly, one aspect of the present technology is a computer-implemented method comprising receiving user input signifying that an application on a computing device is to be locked and, in response to the user input, locking the application to restrict switching to another application or exiting from the application while maintaining other functionalities of the application.

Another aspect of the present technology is a computer-readable medium comprising instructions in code which when loaded into a memory and executed by a processor of a computing device cause the computing device to receive user input signifying that an application on the computing device is to be locked and, in response to the user input, lock the application to restrict switching to another application or exiting from the application while maintaining other functionalities of the application.

Another aspect of the present technology is a computing device that includes a memory for storing an application, a processor operatively coupled to the memory for executing the application, and a user interface for receiving user input. The processor is configured to lock the application in response to the user input to thereby restrict switching to another application or exiting from the application while maintaining other functionalities of the application.

The details and particulars of these aspects of the technology will now be described below, by way of example, with reference to the drawings.

Figure 1:
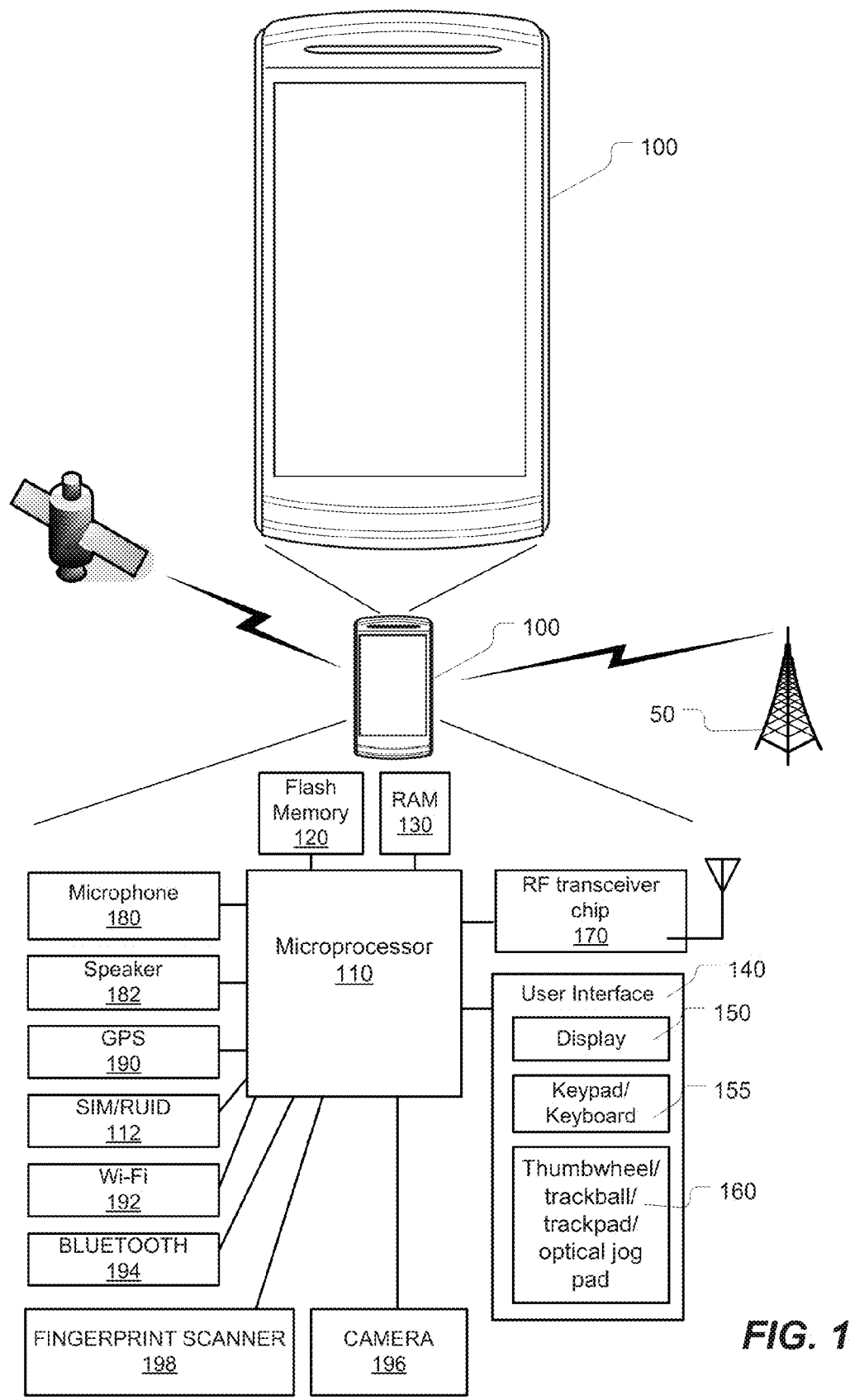
FIG. 1 is a depiction of a mobile device on which the present technology may be implemented, the depiction including a schematic depiction of some components of the mobile device.

FIG. 1 is a depiction of a mobile device as one example of a computing device on which the present technology may be implemented. This mobile device, which is generally designated by reference numeral 100, includes a processor 110 and memory 120, 130 for executing one or more applications. The memory may include flash memory 120 and/or random access memory (RAM) 130. Other types or forms of memory may be used.

As depicted by way of example in FIG. 1, the mobile device 100 includes a user interface 140 for interacting with the mobile device and its applications. The user interface 140 may include one or more user input devices and output devices, such as a display screen 150 (e.g. an LCD or LED screen or touch-sensitive display screen), and a keyboard or keypad 155. The physical keyboard/keypad 155 together with the onscreen display 150 of the corresponding characters forms what shall be referred to herein as a hybrid keyboard/keypad. The user interface may further include an optical jog pad 160 and/or a thumbwheel, trackball, track pad or equivalent.

As depicted by way of example in FIG. 1, the mobile device 100 includes a transceiver 170 for communicating with other devices. The transceiver 170 may be a radiofrequency (RF) transceiver for wirelessly communicating with one or more base stations over a cellular wireless network using cellular communication protocols and standards for both voice calls and packet data transfer such as GSM, CDMA, GPRS, EDGE, UMTS, LTE, etc.

Where the mobile device 100 is a wireless communications device, the device may include a Subscriber Identity Module (SIM) card 112 for GSM-type devices or a Re-Usable Identification Module (RUIM) card for CDMA-type devices. The RF transceiver 170 may include separate voice and data channels.

The mobile device 100 may also include one or more ports for wired connections, e.g. USB, HDMI, FireWire (IEEE 1394), etc.

The mobile device 100 may further include a microphone 180 for transforming voice input in the form of sound waves into an electrical signal, a speaker 182 and/or an earphone jack.

The mobile device 100 may also include a positioning subsystem such as a Global Positioning System (GPS) receiver 190 (e.g. in the form of a chip or chipset) for receiving GPS radio signals transmitted from one or more orbiting GPS satellites. Any other global navigation satellite system (GNSS) receiver may be used in lieu of GPS.

Optionally, the mobile device 100 may include a Wi-Fi™ transceiver 192, a Bluetooth® transceiver 194, and/or a near-field communications (NFC) chip. The computing device 100 may also optionally include a transceiver for WiMax™ (IEEE 802.16), a transceiver for ZigBee® (IEEE 802.15.4-2003 or other wireless personal area networks), an infrared transceiver or an ultra-wideband transceiver.

Optionally, the mobile device may include other sensors like a digital compass and/or a tilt sensor or accelerometer.

The mobile device may include biometric input devices such as a camera 196 and facial recognition software and/or a fingerprint scanner 198.

The mobile device may include other components not mentioned herein.

A mobile device is one example of a computing device 100 on which the present technology may be implemented. Although this technology is primarily intended to be applied to mobile devices such as handheld electronic devices, personal communications devices, smart phones, cell phones, satellite phones, it may also be used on tablets, laptops, palmtops, notebooks, desktop personal computers, handheld game consoles, kiosks, or other such computing devices. Any of these computing devices may be used to implement the present technology provided the computing device includes a processor, memory, and user interface having a user input device and a user output device. The technologies disclosed herein may be employed on either wireless or wired devices or even on devices with no data communication capability. The technology may furthermore be applied to vehicle computer systems having a small keyboard and display or to any computer-controlled machinery, apparatus, or equipment that includes a physical keyboard and display.

To implement this novel technology, the computing device 100 stores an application in the memory 120, 130 (although, in most implementations, the memory will store multiple applications). The applications may be any software application (or "app") such as a browser, e-mail application, instant messenger, photo viewer, photo editor, video camera application, movie maker, word processor, map application, navigation application, social networking application, game, etc. One or more of these applications are executed by the processor 110. To lock one or more of the executing applications, the user interface of the computing device 100 receives user input from the user. In response to the user input, the processor 110 is configured to lock the application. Locking restricts the ability to exit from the application or to switch to another application. Exiting and switching are examples of restricted actions that are restricted (disabled) when the application is locked. Although exiting or switching is restricted, the device still maintains other functionalities of the application. In a main implementation, the device maintains all other functionalities of the device except for the exit function or any command that causes the device to switch to another application. In other words, a guest user is locked within the application such that the guest user can use the application but cannot escape from the application, switch to other applications or use other applications on the device. In one embodiment, the exit function (or exit command) includes a close command/function such as a close application command or close window command. The exit/close command may be received by user input on a user interface element displayed on a graphical interface of the application, by accessing a menu item from a menu, by a predetermined gesture, by a voice command or by any combination thereof. A command to switch to another application may include a command to launch or invoke another application.

Figure 2:
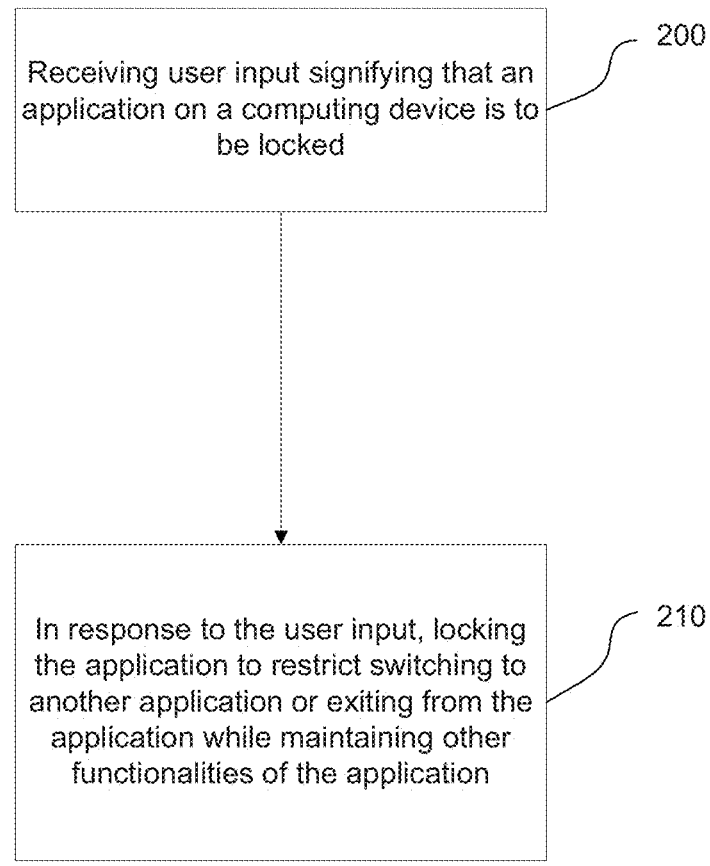
FIG. 2 is a flowchart depicting a method in accordance with an implementation of the technology.

This computing device thus enables a novel computer-implemented method of locking an application. This method is depicted in the flowchart of FIG. 2. As shown in this figure, the method in general terms comprises a step, act or operation 200 of receiving user input, e.g. on a graphical interface of the application, signifying that an application on the computing device is to be locked and a step, act or operation 210 of, in response to receiving the user input, locking the application to restrict switching to another application or exiting from the application while maintaining other functionalities of the application.

Figure 3:
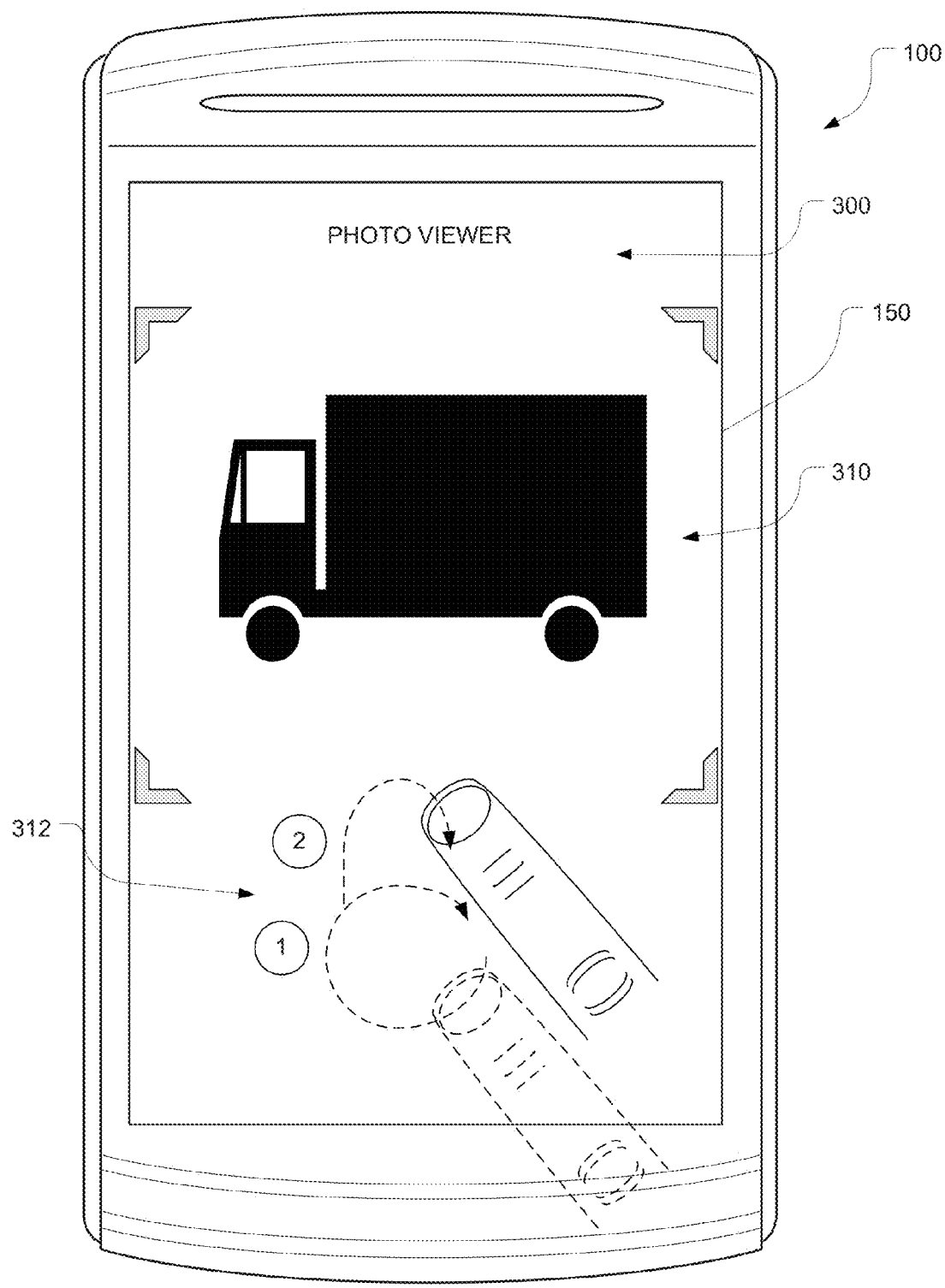
FIG. 3 is a depiction of a mobile device receiving a gesture for locking an application.

Locking of an application may be invoked by a predetermined gesture performed by the user on the graphical user interface. For example, as shown in FIG. 3, the predetermined gesture 312 may be a gesture resembling a padlock. As shown in the example of FIG. 3, the gesture is performed on a touch-screen display 150 of the device 100. The gesture may be performed on an inactive background portion of the display so as not to interfere with the photo 310 displayed by the photo viewer application 300. Any other predetermined gesture may be used to signify that the application is to be locked. For example, an alternative gesture could be an L-shaped swipe with one or more contact points, e.g. drawing an "L" shape on a screen with two fingers in contact with the screen. Other alternative gestures might include a gesture in the shape of a key, keyhole or any other aspect of a physical locking device. The predetermined gesture may be user-configured (i.e. the user may define any customized gesture as the predetermined gesture). Other forms of user input such as, for example, voice commands or key combinations may also be used to trigger or initiate the locking of the application.

Figure 4:
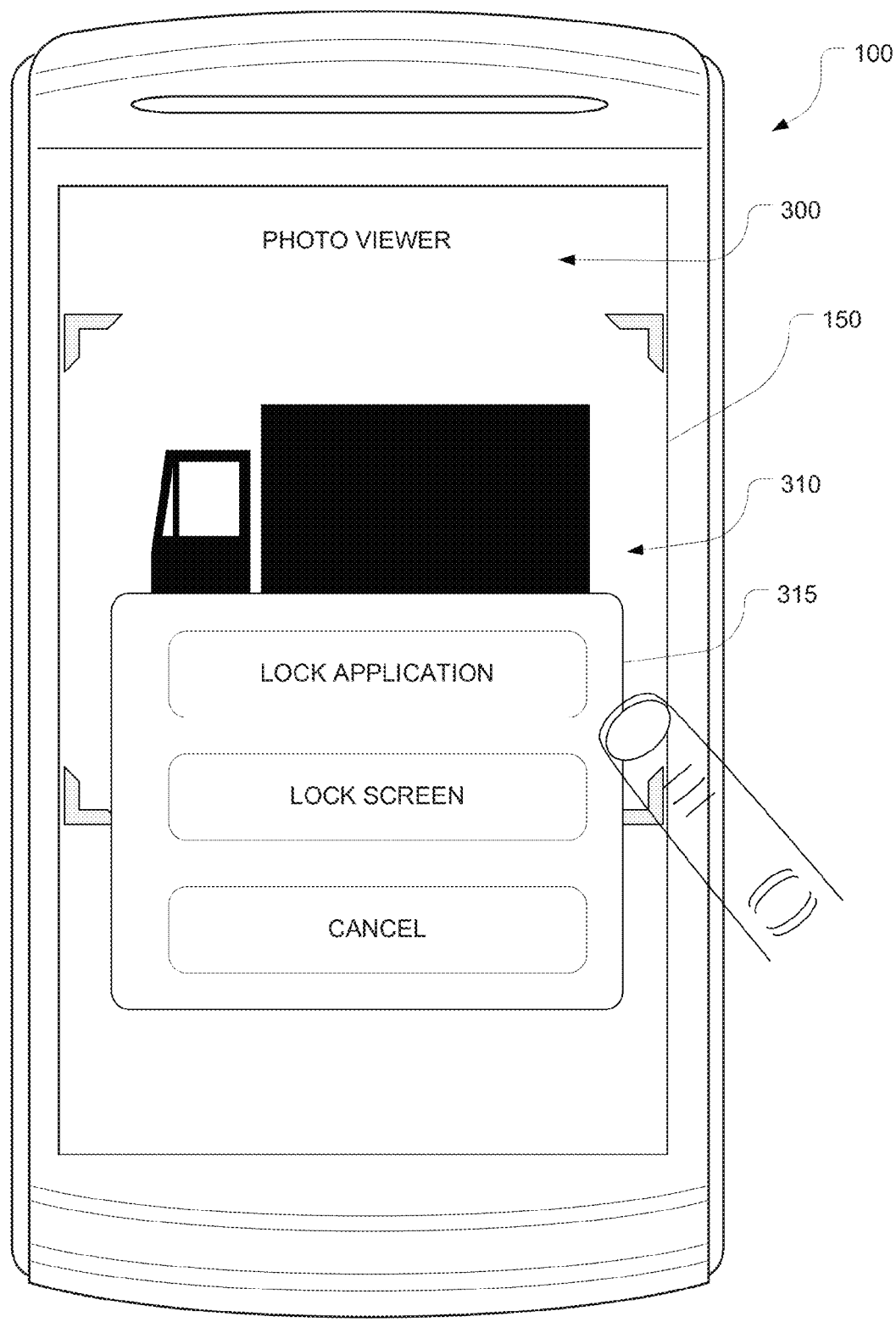
FIG. 4 is a depiction of the mobile device displaying options for locking an application and locking a screen.

In response to the user input (e.g. predetermined gesture), the device may lock the application that is currently being executed (e.g. the photo viewer of FIG. 3) or provide a menu of user-selectable options such as the one shown by way of example in FIG. 4. The menu may be displayed within a window, dialog or box that is superimposed or partially superimposed over the content (e.g. the photo 310). As shown in FIG. 4, the menu 315 of user-selectable options (or lock modes) includes an option to lock the application, an option to lock the screen and an option to cancel. Locking the application (also referred to as a "context lock") locks the guest user inside the application. The guest user can use all functionalities within the application except for restricted actions like exiting or switching to another application. Locking the screen ("freezing" the screen) is considerably more restrictive since the guest user can only view the onscreen content while all other application functions are disabled. This selective disabling of application functions can be achieved using a locking meta-app that cooperates with the application to be locked. The applications can provide a function that can be invoked by the locking meta-app.

Figure 5:
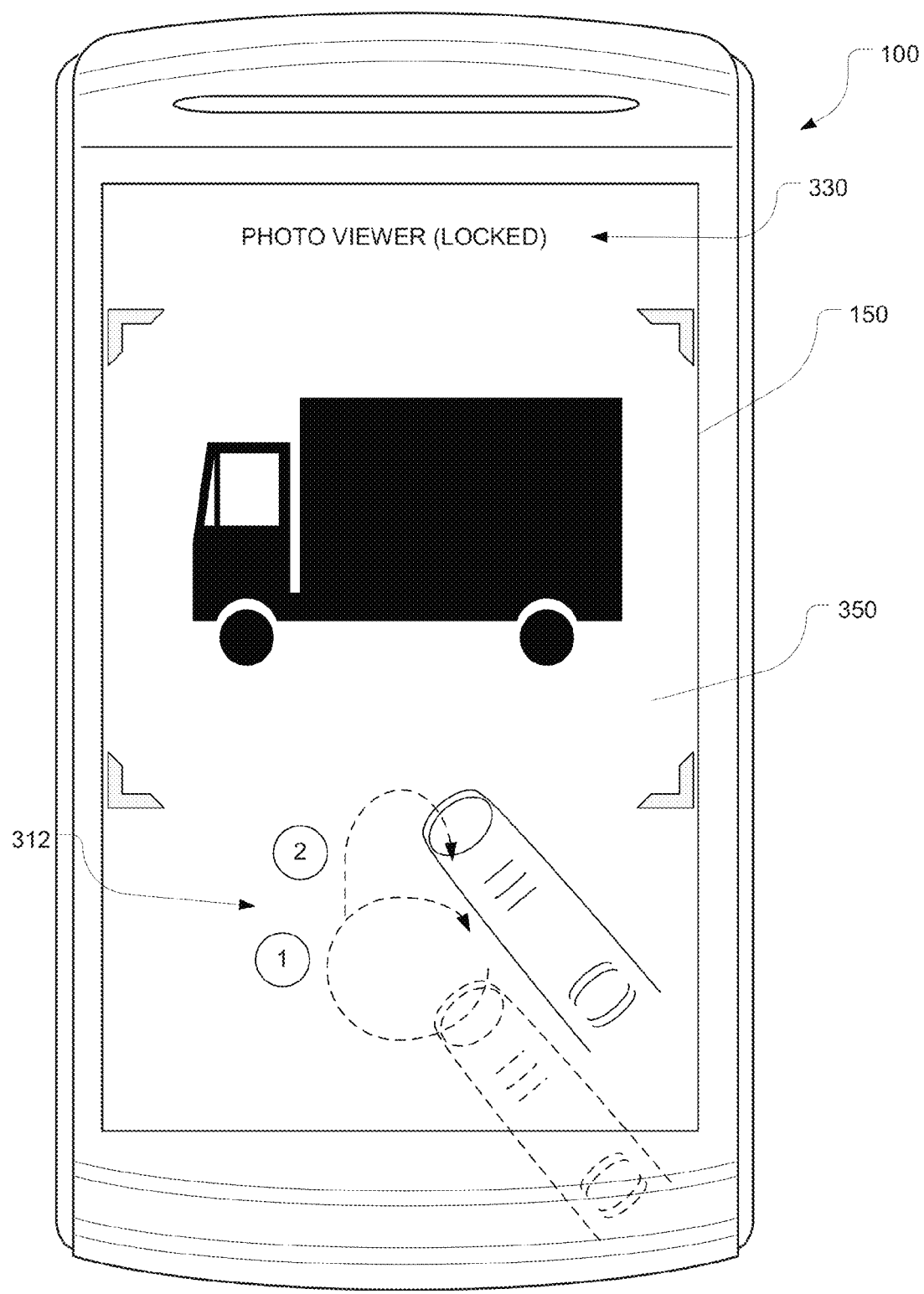
FIG. 5 is a depiction of the mobile device receiving a gesture for unlocking the locked application.
Figure 6:
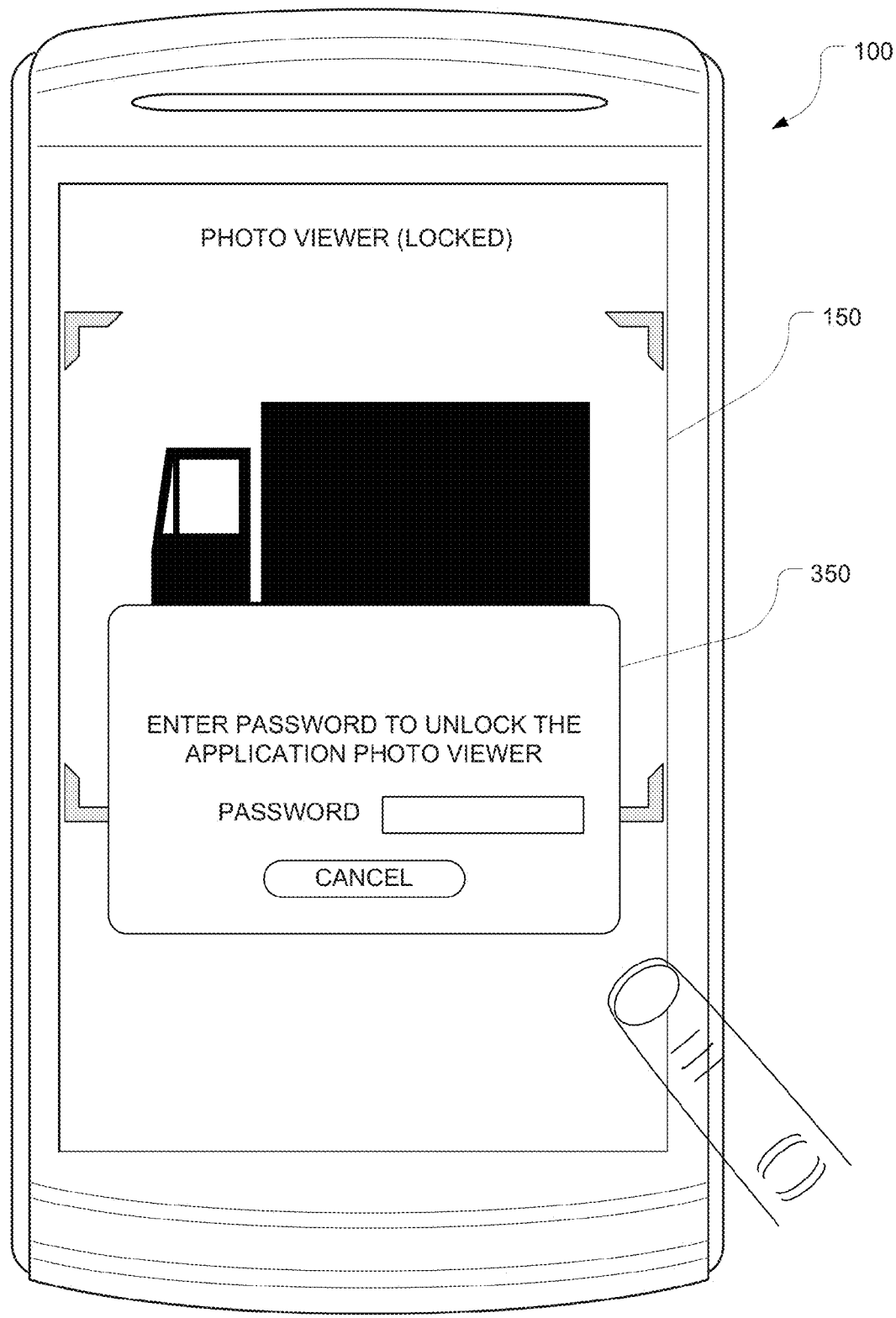
FIG. 6 is a depiction of the entry of user credentials to unlock the locked application.

To unlock a locked application, the user provides an unlock command to the device 100. This unlock command may be a predetermined gesture such, as for example, a gesture 312 in the form of a padlock as shown by way of example in FIG. 5. The same gesture used to lock the application may be used to unlock the application. Alternatively, different gestures may be required to lock and unlock the device. Optionally, the unlock gesture causes the application be immediately unlocked. In another implementation, however, the unlock gesture invokes an access control screen 350 requesting that the user enter user credentials such as a password as shown by way of example in FIG. 6. Alternatively, the user credentials may comprise a biometric input (fingerprint scan, facial recognition, retina scan, voice print), a gesture or a combination thereof. The user may input the password using the keyboard or keypad) which may be a hard physical keyboard or keypad or a soft virtual keyboard or keypad (on a touch-screen device). The computing device 100 may comprise a biometric input device (fingerprint scanner, camera 196, etc.) for providing biometric input. The user credentials may be the same as required by the main login screen or they may be different. The access control screen 350 may be a full-screen interface or a window, dialog, box, etc.) that occupies less than the entire onscreen space.

While the application is locked, any restricted-action command (e.g. an exit command or switch application command) is, in some embodiments, ignored by the device since the functionality has been disabled. However, in other embodiments, the device will bring up the access control screen 350 or prompt the user to provide the predetermined gesture in response to receiving a restricted-action command. In other words, in response to the restricted-action command, the processor may be configured to provide an access control screen requesting input of user credentials.

The operation of this technology will now be further illustrated with an example in which the main user of the mobile device 100 wishes to show a guest user the photo 310 in the photo viewer application 300 without risking that the guest user accidentally or deliberately accesses other photos, content or applications on the device. To lock the application, the user provides user input on a user interface element 320 (e.g. a predetermined gesture in the shape of a padlock). The status of the application as locked may be optionally displayed in a lock status indicator 330. While the application is locked, other functions, buttons, user interface elements, menus, commands work normally with the application. For example, the guest user may send, edit, or delete the photo. If these functionalities are to be disabled, the main user could select the more restrictive "lock screen" (freeze onscreen content) in the options 315 instead of the more permissive "lock application".

When the main user gets his device back, the main user (e.g. the device owner) may unlock the application or screen by performing an unlock gesture, e.g. the padlock gesture, The unlock command may directly unlock the application or it may invoke an access control screen 350 requesting user credentials. Once the device has been unlocked, all applications and functions return to their default unlocked state in which all applications and functions are generally operational for all users.

Locking a guest user into an application may restrict the guest user to just the locked application or, alternatively, it may permit the guest user access to related applications. Related applications are other applications, whether already executing or not, that share data with the locked application or use data from the locked application to perform a further task. In one implementation, the processor is configured to receive user input to define one or more related applications which can be also used when the application is locked. For example, locking a camera application might permit the guest user to also use an e-mail application to send a picture taken by the camera application. In one embodiment, the guest user is granted unfettered access to the related application (e.g. the e-mail application). In another embodiment, the access is limited to a particular related function, e.g. sending the photo. Once the related function has been performed, (e.g. once the photo has been sent) the related application closes automatically or otherwise prevents the guest user from performing any other tasks in the related application. In one embodiment, the user may define groups of applications or specific application functions that may be accessed from within the locked application. For example, the device may provide a lock options and settings screen that enables the user to select or identify groups of applications within which the user may operate or navigate.

Figure 7:
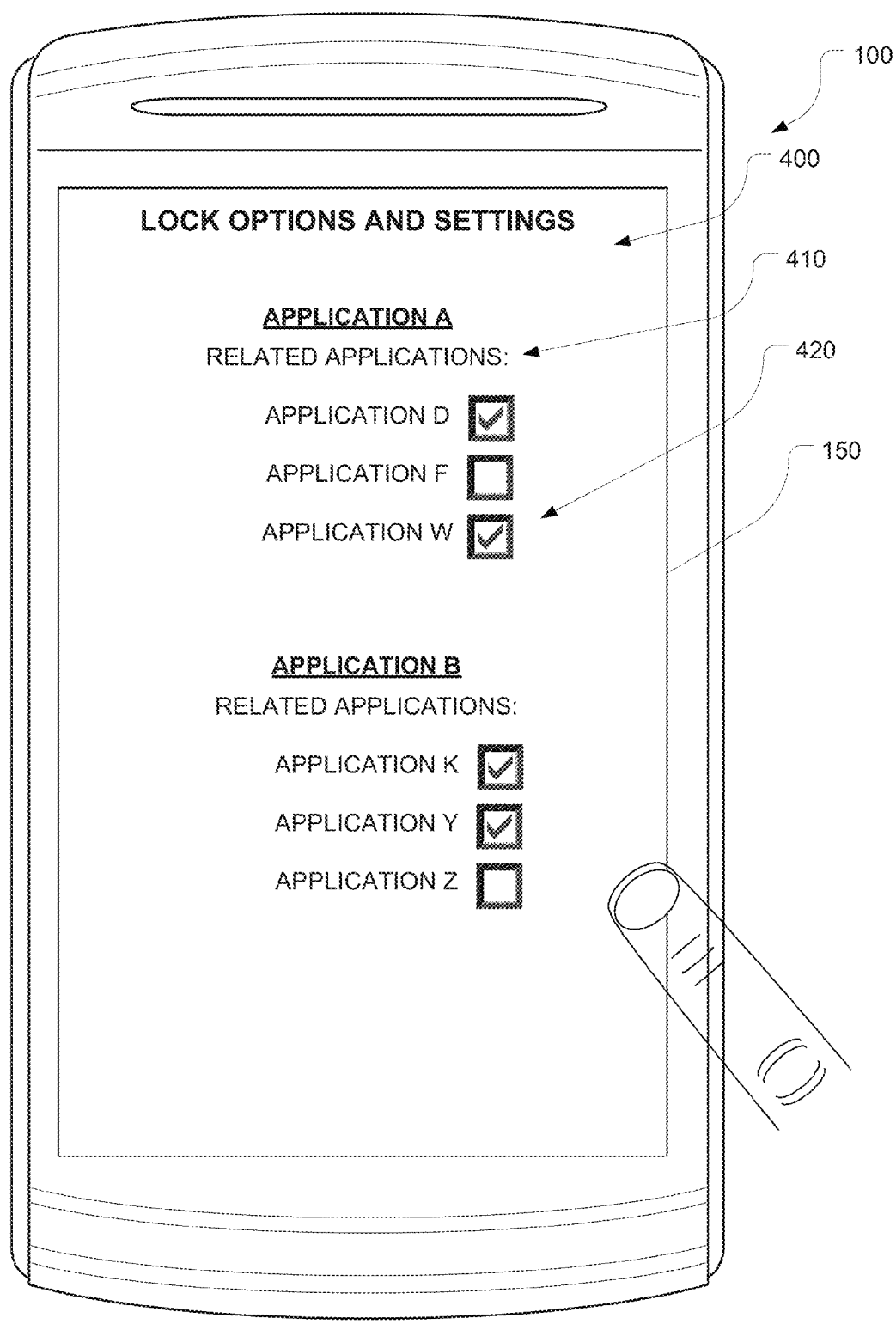
FIG. 7 depicts an example of a lock options and settings page for permitting access to related applications from within a locked application.

An example of a lock options and setting page is depicted in FIG. 7. The lock options and settings page 400 identifies applications (e.g. Application A and Application B) and enables predetermined related applications 410 to be selected or de-selected, for example using check boxes 420 as shown or by any other suitable technique. In another embodiment, the user may also pre-select (i.e. manually identify) which related applications are to be included in the list of related applications 410 for a given application. To lock an application and its related applications, the main user performs a padlock gesture or provides any other recognizable input. This locks the guest user into the application but permits the guest user to also use any of the related applications.

The locked state of the locked application may be indefinite (until the main user provides the user credentials) or it may expire after a predetermined period of time has elapsed. In other words, in one embodiment, the locked application automatically unlocks after a predetermined time has elapsed. In other embodiment, unlocked application may be configured to be automatically locked after a predetermined period of time has elapsed. These application lock timers may be set when locking the application or default times may be specified by configuring application lock settings and preferences in a settings and options page.

Figure 8:
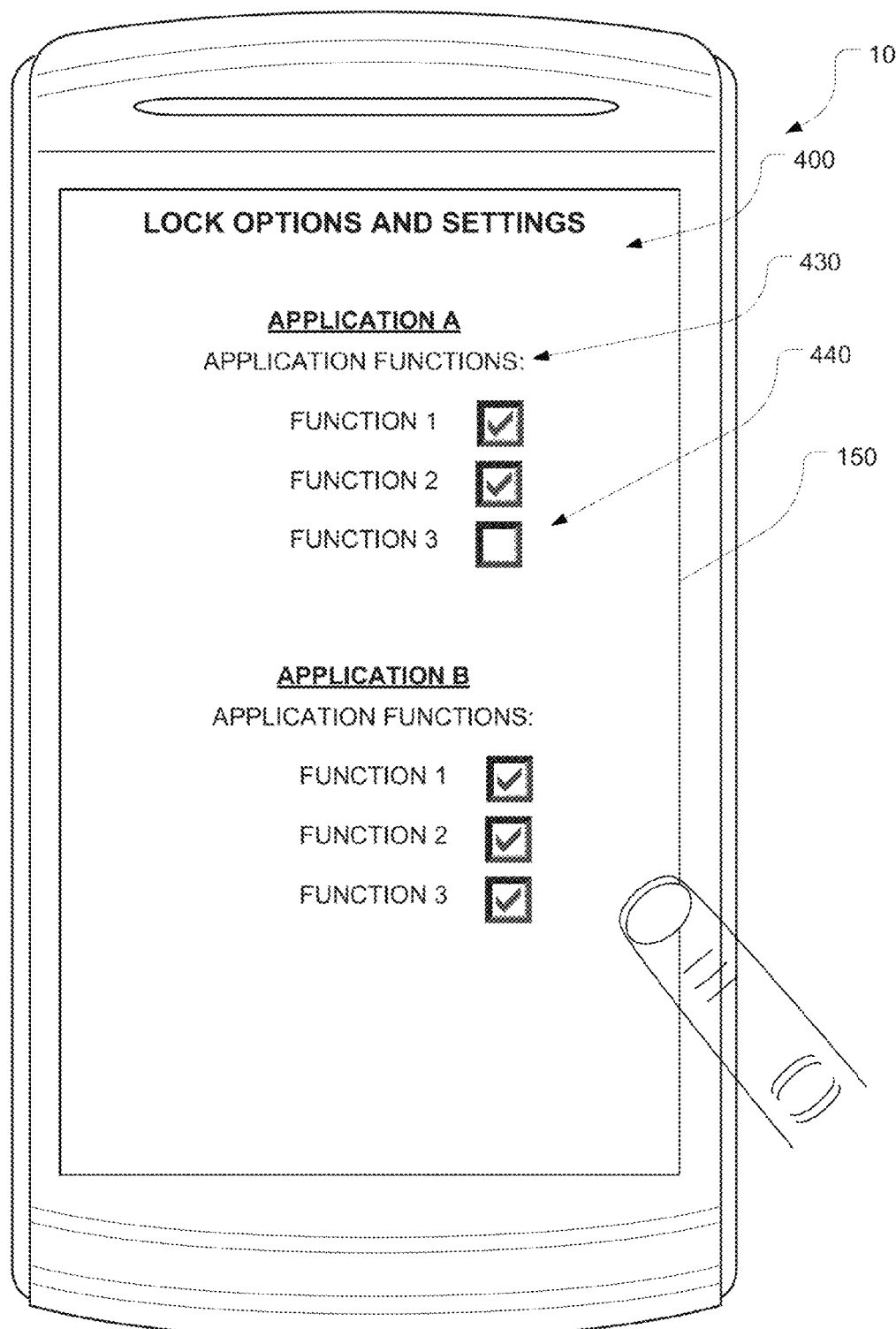
FIG. 8 depicts an example of another lock options and settings page that disables certain functions within a locked application.

In one implementation, the processor is configured to receive user input to define which functionalities (application functions) of the applications are operative and which are inoperative. Inoperative functions are also referred to as restricted actions. In addition to exiting from an application or switching applications, restricted actions (inoperative functions) may include deleting content, communicating content, editing content, encrypting content, etc. The main user may enable and/or disable any of the functions, menus, options, settings, etc. that would ordinarily be operative within the application. For example, the user may limit the ability to download data from the internet, to transmit data, to purchase apps, songs, videos, or other content, to communicate with other users or with specific users. The user may configure functionalities based on criteria, classes, categories, etc. such as functions involving cellular data consumption, functions that exceed a minimum threshold of battery consumption, activities that incur financial charges such as downloading apps, songs, videos, etc. or buying goods or services using mobile payment, activities that relate to device settings, software updates, etc. An example of a function configuration page is depicted in FIG. 8. As shown in this figure, for Application A, the user may enable or disable each of the functions 430 e.g. Function 1, Function 2, Function 3, etc. The functions 430 may be enabled or disabled using check boxes as shown or any other suitable technique. In another related implementation, the user may configure the mobile device to enable or disable default functions of the device like phoning, text messaging, taking photos with a camera, etc while the guest user is in a locked application. For example, the main user may wish to preclude the guest user from answering or placing calls or from sending or reading text messages while the guest user is in a locked application. Alternatively, the main user may wish to allow the guest user to answer incoming calls but not place any outgoing calls when inside a locked application. The main user may configure the device by selecting which default functions are enabled and which are disabled using an options and settings page.

Figure 9:
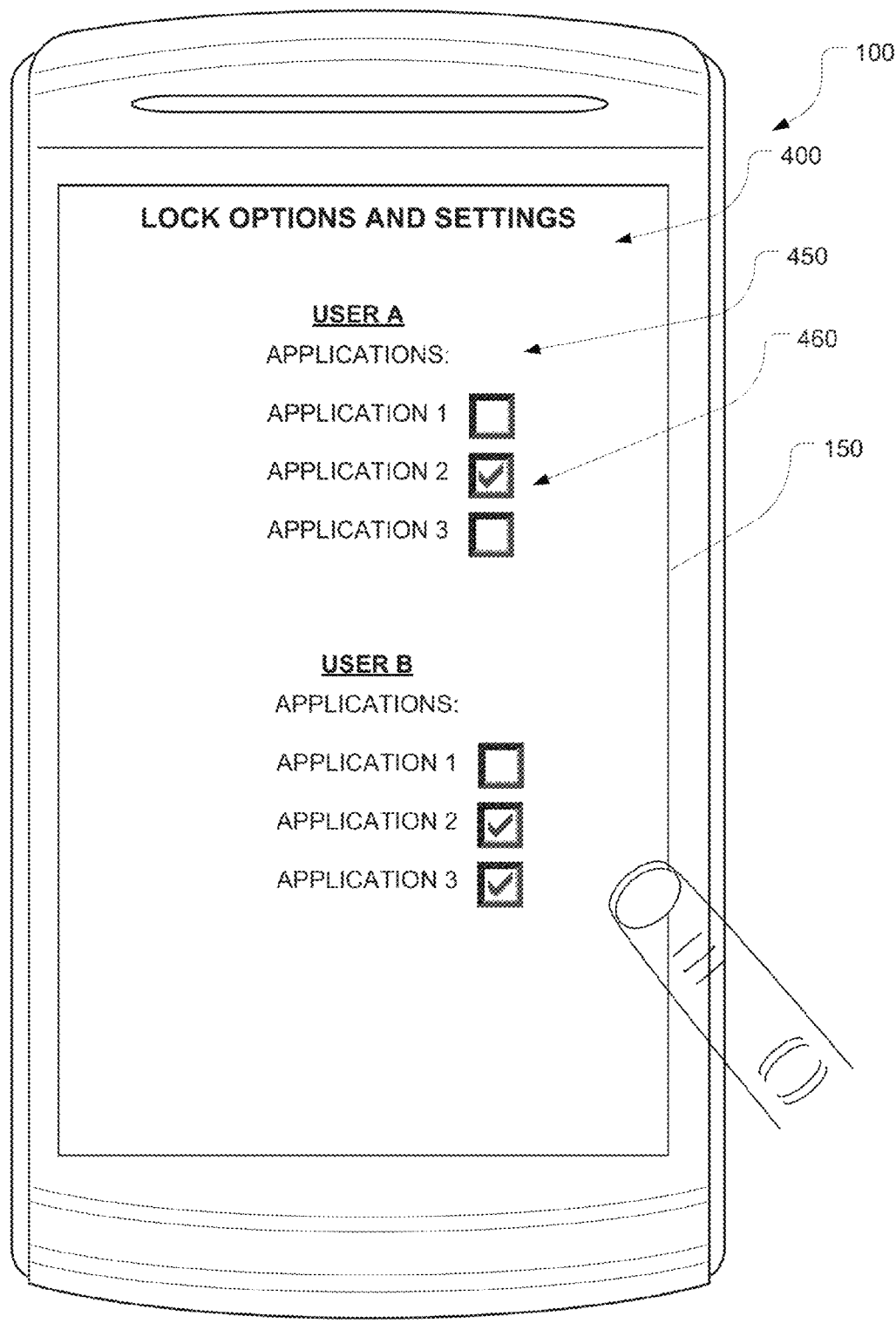
FIG. 9 depicts an example of another lock options and settings page that limits functions within a locked application based on the identity of the user.

From the foregoing, it should be apparent that the locked application and locked screen modes are useful to control how guest users interact with the device. A locked application mode may be useful to permit, for example, a child to play a game on a device without worrying that the child will exit from the game or switch to another application on the device. The locked screen mode is useful for fixing content onscreen. For example, the main user may wish to show a photograph, video, slideshow, etc. on a handheld computing device (like a touch-screen tablet) to a relative (a "guest user") who is unfamiliar with the operation of the device. The main user locks the photo or other content onscreen. The locking of the content (screen freeze) means that the main user can pass the tablet to others (guest users) without worrying that the guest users will view other photos or inadvertently close the viewer by accidentally providing touch input or gesture input to the device. Without the locking function, the relative (guest user) handling the device may unwittingly close the photo viewer, swipe to a different photo, or activate a function by touch screen input which stops the slideshow. Any user input by the guest users that would otherwise close the photo or cause the next photo to be displayed is ignored by the device. Similarly, the main user can lock not only photos, videos, slideshows but any screen-grab (or screenshot) of the currently displayed screen of any application such as a word processing document, a spreadsheet, a web page, a game screen, etc. In a further implementation, biometric input can be used to identify or recognize the guest user. The access controls may be varied automatically based on the identity of the guest user. For example, access to a first set of applications may be granted to a first guest user and access to a second set of applications may be granted to a second guest user. In other words, each guest user identified by biometric input (e.g. facial recognition) may have his or her own set of applications within which the guest user may operate. The device may automatically recognize the guest user (without any user intervention or user input), for example by facial recognition via the camera and a facial-recognition module or application executed by the device, or by any other user-recognition system that uses some unique identifier or characteristic of the user, e.g. voice print, typing style, etc. The device then automatically configures the application lock to grant or restrict access to one or more predetermined applications in response to identifying the guest user. The main user may configure the device using a user-specific lock configuration page such as the one depicted by way of example in FIG. 9. In the example presented in FIG. 9, the configuration page (which may be part of the options and settings page 400) may identify, list or name the guest users 450 (e.g. User A, User B, etc.). For each guest user, the device indicates which applications are accessible or usable. If the guest user is locked into one of the permitted applications, the user may use the functions of that application and may optionally navigate or launch any of the other permitted applications.

Figure 10:
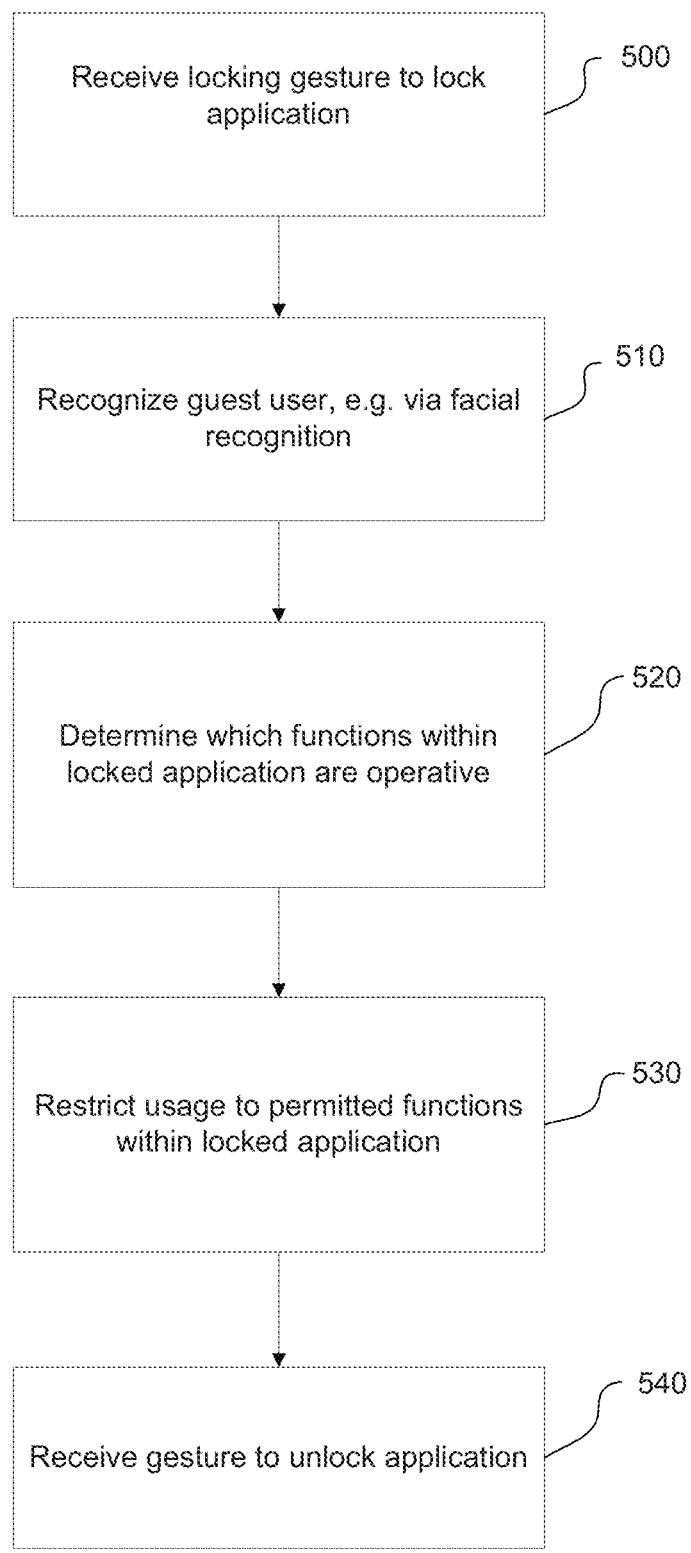
FIG. 10 is a flowchart of a method of restricting functions in a locked application based on the identity of the user.

FIG. 10 presents a recognized-user access control method for controlling access to functions within a locked application based on the identity of the guest user. This may be useful when a main user wishes to share a device with a plurality of different guest users. For example, a father may wish to lock his children into a game application, with fewer functions for the younger child. This method is depicted in general terms in the flowchart of FIG. 10. As shown in this figure, the method entails a step, act or operation 500 of locking an application by receiving a locking gesture. A subsequent step, act or operation 510 involves identifying or recognizing a guest user e.g. via facial recognition. The method then entails a step, act or operation 520 of determining which functions within the locked application are operative or inoperative for that particular user. The method further entails a step, act or operation 530 of restricting usage of the computing device to permitted functions within the locked application. The method further entails a step, act or operation 540 of unlocking the application in response to an unlock gesture. Thus, the method enables the main user to share a computing device with multiple guest users for whom the permitted functions with the locked application are automatically adjusted based on which guest user is currently operating the device.

The application-locking technology may be used with an application that has already been launched by the main user or with an application that the guest user launches on his or her own. In other words, the application locking technology is primarily intended to lock an application that is already executing because it has been launched by the main user, but it can also be used in other embodiments to lock an application that has not yet been launched. In that case, the guest user may view a main screen or desktop of the computing device and launch a permitted application. The restricted applications may be invisible or greyed out or simply unresponsive to a launch command.

Any of the methods disclosed herein may be implemented in hardware, software, firmware or any combination thereof. Where implemented as software, the method steps, acts or operations may be programmed or coded as computer-readable instructions and recorded electronically, magnetically or optically on a fixed, permanent, non-volatile or non-transitory computer-readable medium, computer-readable memory, machine-readable memory or computer program product. In other words, the computer-readable memory or computer-readable medium comprises instructions in code which when loaded into a memory and executed on a processor of a computing device cause the computing device to perform one or more of the foregoing method(s).

A computer-readable medium can be any means that contain, store, communicate, propagate or transport the program for use by or in connection with the instruction execution system, apparatus or device. The computer-readable medium may be electronic, magnetic, optical, electromagnetic, infrared or any semiconductor system or device. For example, computer executable code to perform the methods disclosed herein may be tangibly recorded on a computer-readable medium including, but not limited to, a floppy-disk, a CD-ROM, a DVD, RAM, ROM, EPROM, Flash Memory or any suitable memory card, etc. The method may also be implemented in hardware. A hardware implementation might employ discrete logic circuits having logic gates for implementing logic functions on data signals, an application-specific integrated circuit (ASIC) having appropriate combinational logic gates, a programmable gate array (PGA), a field programmable gate array (FPGA), etc.

This invention has been described in terms of specific embodiments, implementations and configurations which are intended to be exemplary only. Persons of ordinary skill in the art will appreciate, having read this disclosure, that many obvious variations, modifications and refinements may be made without departing from the inventive concept(s) presented herein. The scope of the exclusive right sought by the Applicant(s) is therefore intended to be limited solely by the appended claims.

The invention claimed is:

1. A computer-implemented method comprising:
associating each of a plurality of guest users identified by a respective biometric identifier to sets of functions within one or more applications;
executing an application on a computing device while in an unlocked state, the unlocked state providing unrestricted user access to all applications and functionalities of the computing device;
receiving, in the unlocked state, a predetermined gesture user input signifying that the executing application on the computing device is to be locked;
in response to the predetermined gesture user input, locking the executing application; and
reading a biometric identifier and allowing access to selective sets of functions within the locked application that correspond to the guest user identified by the read biometric identifier.

2. The method as claimed in claim 1 wherein receiving the user input signifying that the application is to be locked comprises detecting a predetermined gesture resembling a padlock.

3. The method as claimed in claim 1 further comprising displaying user selectable options to lock the application or to lock a currently displayed screen being displayed by the application.

4. The method as claimed in claim 1 further comprising:
receiving a command to unlock the application or perform a restricted action;
in response to the command, requesting input of user credentials; and
unlocking the application or performing the restricted action only if the user credentials are provided.

5. The method as claimed in claim 1 further comprising receiving user input to define one or more related applications which can be also used when the application is locked.

6. The method as claimed in claim 1 further comprising receiving user input to define which functionalities of the application are operative and which are inoperative.

7. A non-transitory computer-readable medium comprising instructions in code which when loaded into a memory and executed by a processor of a computing device cause the computing device to:
associate each of a plurality of guest users identified by a respective biometric identifier to sets of functions within one or more applications;
execute an application on a computing device while in an unlocked state, the unlocked state providing unrestricted user access to all applications and functionalities of the computing device;
receive on the computing device that is the unlocked state a predetermined gesture user input signifying that the executing application on the computing device is to be locked; and
in response to the predetermined gesture user input, lock the executing application; and
read a biometric identifier to allow access to selective sets of functions within the locked application that correspond to the guest user identified by the read biometric identifier.

8. The computer-readable medium as claimed in claim 7 wherein receiving the user input signifying that the application is to be locked comprises detecting a predetermined gesture resembling a padlock.

9. The computer-readable medium as claimed claim 7 further comprising code that causes the computing device to display user selectable options to lock the application or to lock a currently displayed screen being displayed by the application.

10. The computer-readable medium as claimed in claim 7 further comprising code that causes the computing device to:
receive a command to unlock the application or perform a restricted action;
in response to the command, request input of user credentials; and
unlock the application or perform the restricted action only if the user credentials are provided.

11. The computer-readable medium as claimed in claim 7 further comprising code that causes the computing device to receive user input to define one or more related applications which can be also used when the application is locked.

12. The computer-readable medium as claimed in claim 7 further comprising code that causes the computing device to receive user input to define which functionalities of the application are operative and which are inoperative.

13. A computing device comprising:
a memory for storing an application;
a processor operatively coupled to the memory for:
associating each of a plurality of guest users identified by a respective biometric identifier to sets of functions within one or more applications; and
executing the application while in an unlocked state, the unlocked state providing unrestricted user access to all applications and functionalities of the computing device; and
a user interface for:
receiving on the computing device that is the unlocked state, a predetermined gesture user input, wherein the processor is configured to lock the executing application in response to the predetermined gesture user input, and
reading a biometric identifier and allowing access to selective sets of functions within the locked application that correspond to the guest user identified by the read biometric identifier.

14. The computing device as claimed in claim 13 wherein the processor is configured recognize a predetermined gesture resembling a padlock as the user input signifying that the application is to be locked.

15. The computing device as claimed claim 13 wherein the processor is configured to provide user selectable options to lock the application or to lock a currently displayed screen being displayed by the application.

16. The computing device as claimed in claim 13 wherein the processor is configured to:
receive a command to unlock the application or perform a restricted action;

in response to the command, request input of user credentials; and unlock the application or perform the restricted action only if the user credentials are provided.

17. The computing device as claimed in claim 13 wherein the processor is configured to receive user input to define one or more related applications which can be also used when the application is locked.

18. The computing device as claimed in claim 13 wherein the processor is configured to receive user input to define which functionalities of the application are operative and which are inoperative.

\* \* \* \* \*